United States Patent
Sawamura et al.

(10) Patent No.: US 6,400,654 B1
(45) Date of Patent: Jun. 4, 2002

(54) MAGNETO-OPTICAL RECORDING AND REPRODUCING DEVICE CAPABLE OF SUPPRESSING CROSS TALK

(75) Inventors: Shinzo Sawamura, Nishinomiya; Hiroyuki Katayama, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/530,887
(22) PCT Filed: Oct. 22, 1998
(86) PCT No.: PCT/JP98/04801
§ 371 (c)(1),
(2), (4) Date: Jul. 3, 2000
(87) PCT Pub. No.: WO99/24978
PCT Pub. Date: May 20, 1999

(30) Foreign Application Priority Data

Nov. 7, 1997 (JP) ............................................. 9-306157

(51) Int. Cl.[7] ............................................. G11B 11/00
(52) U.S. Cl. .................................. 369/13.14; 369/13.26
(58) Field of Search ............................ 369/13, 14, 116; 360/59, 114; 428/64.3, 64.1, 694 ML, 694 MM

(56) References Cited

U.S. PATENT DOCUMENTS

| | | | | |
|---|---|---|---|---|
| 5,293,359 A | * | 3/1994 | Ohta et al. ..................... | 369/13 |
| 5,945,228 A | * | 8/1999 | Nishikiori ..................... | 369/13 |
| 6,018,511 A | * | 1/2000 | Nishikiori et al. ............ | 369/13 |

FOREIGN PATENT DOCUMENTS

| | | |
|---|---|---|
| JP | 2617025 | 3/1997 |
| JP | 2636957 | 4/1997 |

* cited by examiner

*Primary Examiner*—Tan Dinh
(74) *Attorney, Agent, or Firm*—Dike, Bronstein, Roberts & Cushman; Intellectual Property Practice Group of Edwards & Angell, LLP

(57) ABSTRACT

The present magnetic recording and reproducing device is provided with a magnetic head (5), which, during recording, applies an external magnetic field to a recording medium (6) having a recording layer made of a ferrimagnetic material, and with a laser light source, which increases the temperature of the recording medium (6) in domains (Tr1 and Tr2) which are opposite the magnetic head (5), but exclude a track to be recorded (Tr), which is a domain for recording. Consequently, a magnetic recording and reproducing device can be provided which is capable of suppressing crosstalk and realizing higher recording density than conventionally.

27 Claims, 11 Drawing Sheets

MAGNETO-OPTICAL RECORDING AND REPRODUCING DEVICE CAPABLE OF SUPPRESSING CROSS TALK

TECHNICAL FIELD

The present invention relates to a magnetic recording device and a magnetic recording and reproducing device which perform magnetic recording in a recording medium by increasing the temperature thereof using a light beam, etc., and to a method of performing such magnetic recording.

BACKGROUND ART

In the field of optical memory elements, in addition to read-only memories such as the compact disk, recent years have seen the development of recordable memories. Of these, memory elements such as the magneto-optical disk have already been put to practical use.

Such a magneto-optical disk in practical use is a recording medium which uses a perpendicularly magnetized film such as a thin film of a rare earth-transition metal alloy. Information is recorded therein by applying an external magnetic field while projecting laser light thereon. Reproducing from such a magneto-optical disk, on the other hand, makes use of the so-called Kerr effect, in which, when laser light is projected onto the magneto-optical disk, the direction of rotation of the polarization plane of light reflected therefrom changes depending on the presence or absence of recorded information.

With regard to recording and reproducing methods for other types of recording media, one conventional method which has been proposed is a recording and reproducing method for a recording medium made of ferromagnetic material of, for example, $CrO_2$. In this recording and reproducing method, recording is performed by reducing coercive force by projecting laser light onto the recording medium and applying an external magnetic field thereto using a magnetic recording head, and reproducing is performed magnetically using a magnetic reproducing head.

However, in the foregoing recording and reproducing method, since the magnetic reproducing head is used to magnetically reproduce information, information cannot be reproduced from tracks narrower than the width of the magnetic reproducing head (its width in the track width direction, i.e., perpendicular to the track direction).

Therefore, methods such as the following have been proposed for recording and reproducing using tracks narrower than the magnetic head width, and for preventing crosstalk from adjacent tracks.

Japanese Unexamined Patent Publication No. 4-95201/1992 (Tokukaihei 4-95201) discloses a recording and reproducing method using a recording medium made of ferrimagnetic material. In this method, during recording, the temperature of a track of the recording medium to be recorded is increased to the vicinity of its Curie temperature by projecting a light beam along the track, and information is recorded in the track by using a magnetic recording head to apply an external magnetic field thereto. During reproducing, domains opposite the magnetic reproducing head on both sides of a track of the recording medium to be reproduced are heated to the vicinity of the magnetic compensation temperature thereof by projecting light beams onto those domains, and the magnetic reproducing head performs reproducing magnetically.

Further, Japanese Unexamined Patent Publication No. 4-176034/1992 (Tokukaihei 4-176034) discloses a recording and reproducing method using a recording medium made of ferrimagnetic material having a compensation point substantially at room temperature. In this method, during recording, the temperature of a track of the recording medium to be recorded is increased to the vicinity of its Curie temperature by projecting a light beam along the track, and information is recorded in the track by using a magnetic recording head to apply an external magnetic field thereto. During reproducing, magnetization of a domain to be reproduced is increased by projecting a light beam along a track of the recording medium to be reproduced, and a magnetic reproducing head performs reproducing magnetically.

However, in each of the foregoing conventional recording and reproducing methods, due to the influence of a temperature distribution at the recorded bit during recording, the recorded marks are in the form of crescents. For this reason, when using an ordinary magnetic head, increasing linear recording density is likely to lead to crosstalk between adjacent recorded bits in the track direction, and reproducing signal power is also decreased, making accurate reproducing difficult.

A method of resolving the foregoing problems which has been proposed in the past is to perform reproducing using a reproducing head of shape like a crescent. However, manufacture of a crescent-shaped reproducing head leads to further problems, such as complicating the manufacturing process and increasing manufacturing costs.

DISCLOSURE OF THE INVENTION

The present invention was made in view of the foregoing problems with the conventional art, and it is an object hereof to provide a magnetic recording device and a magnetic recording method which are capable of suppressing crosstalk and realizing higher recording density than conventionally. Another object of the present invention is to provide a magnetic recording and reproducing device capable of suppressing crosstalk and realizing higher recording density than conventionally.

(i) In order to attain the foregoing object, a magnetic recording device according to the present invention performs recording using a recording medium having a recording layer made of ferrimagnetic material, and comprises a magnetic head, which applies an external magnetic field to the recording medium during recording; and local temperature increasing means (such as a laser light source), which increase the temperature of the recording medium in a domain thereof opposite the magnetic head but excluding a domain for recording (such as the track to be recorded).

The recording medium made of ferrimagnetic material has a magnetic compensation point, and coercive force increases with increase in temperature. At the magnetic compensation point, residual magnetization is zero, and coercive force is infinite. Accordingly, as specified above, during recording, the local temperature increasing means locally increase the temperature of the domain of the recording medium opposite the magnetic head but outside the domain for recording, so as to give the surrounding domain a greater coercive force than the domain for recording. Then the magnetic head applies to the domain opposite the magnetic head a magnetic field greater than the coercive force of the domain for recording (i.e., its coercive force at room temperature), and smaller than the coercive force in the domain of increased temperature. Thus it is possible to record information accurately in the domain for recording.

At this time, the domain whose temperature is increased by the local temperature increasing means is a domain other than the domain for recording. Accordingly, when recording information using the foregoing magnetic recording device, the temperature distribution rarely extends to the actual domain for recording. For this reason, if the foregoing magnetic recording device is used, the shape of the recorded marks can be made substantially rectangular, thus reducing crosstalk.

Further, since information was conventionally recorded at the Curie temperature, the domain for recording was the area of increased temperature. For this reason, conventionally, the size of the recorded domain was equivalent to the width of the local temperature increasing means (the diameter of a light beam spot, track width of a heater, etc.).

With the present invention, in contrast, since the area whose temperature is increased by the local temperature increasing means is not the actual domain for recording, but the surrounding domain, the size of the domain for recording is not limited by the diameter of the light beam spot.

(ii) In the foregoing magnetic recording device, the domain whose temperature is increased by the local temperature increasing means is preferably made up of domains adjacent to the domain for recording, on both sides thereof.

When the domain for recording is one side of a domain of the recording medium opposite the magnetic head, the domain whose temperature is increased may be a domain adjacent to the domain for recording on one side thereof. However, in this case, the area of increased temperature is larger than when domains on both sides of the domain for recording are heated. For example, if the local temperature increasing means are light beam projecting means, the diameter of the light beam spot must be increased.

When domains on both sides of the domain for recording are heated, in contrast, the diameter of the e.g. light beam spot can be decreased, and the temperature and extent of the domains of increased temperature can be accurately controlled.

(iii) In the magnetic recording device in (ii) above, it is preferable if the local temperature increasing means are light beam projecting means, and if the magnetic head has a width of less than three times a width of each domain of increased temperature adjacent to the domain for recording.

If the width of the magnetic head is set to less than three times the width of each domain of increased temperature adjacent to the domain for recording, the width of the domain not heated, i.e. of the domain for recording, will be less than the width of the local temperature increasing means (the diameter of a light beam spot, width of a heater, etc.). Accordingly, with this structure, recording can be performed in domains narrower than conventionally, without decreasing the size of the magnetic head or the width of the local temperature increasing means (diameter of a light beam spot, etc.). This simplifies manufacture of the magnetic head, and is advantageous in decreasing track width and increasing recording density.

(iv) In the magnetic recording device in any one of (i) through (iii) above, it is preferable if the magnetic head and the local temperature increasing means are both provided on the same side of the recording medium, and if the magnetic head is provided after the local temperature increasing means with respect to a direction of motion of the recording medium.

If the magnetic head and the local temperature increasing means are provided on the same side of the recording medium and the magnetic head is provided after the local temperature increasing means with respect to the direction of motion of the recording medium, the magnetic head can perform recording immediately after heating by the local temperature increasing means. In this case, heating and cooling can be performed efficiently, and spreading of the domain of increased temperature on the recording medium can be suppressed.

(v) In the magnetic recording device of any one of (i) through (iv) above, the local temperature increasing means are preferably light beam projecting means.

By using light beam projecting means as the local temperature increasing means, a narrow domain can easily be increased in temperature. In addition, it is possible to change the width and temperature of the domain of increased temperature by adjusting the power of the light beam. This means that the medium can easily be brought to the same coercive force with high repeatability, which is advantageous in forming equal track widths.

(vi) In order to attain the foregoing objects, a magnetic recording and reproducing device according to the present invention performs recording and reproducing using a recording medium having a recording layer made of ferrimagnetic material, and comprises a magnetic recording head, which, during recording, applies an external magnetic field to the recording medium; and local temperature increasing means for recording (such as a laser light source, heater, etc.), which increase the temperature of the recording medium in a domain thereof opposite the magnetic recording head but excluding a domain for recording.

The recording medium made of ferrimagnetic material has a magnetic compensation point, and coercive force increases with increase in temperature. At the magnetic compensation point, residual magnetization is zero, and coercive force is infinite. Accordingly, as specified above, during recording, the local temperature increasing means locally increase the temperature of the domain of the recording medium opposite the magnetic head but outside the domain for recording, so as to give the surrounding domain a greater coercive force than the domain for recording. Then the magnetic head applies to the domain opposite the magnetic head a magnetic field greater than the coercive force of the domain for recording (i.e., its coercive force at room temperature), and smaller than the coercive force in the domain of increased temperature. Thus it is possible to record information accurately in the domain for recording.

At this time, the domain whose temperature is increased by the local temperature increasing means is a domain other than the domain for recording. Accordingly, when recording information using the foregoing magnetic recording and reproducing device, the temperature distribution rarely extends to the actual domain for recording. For this reason, if the foregoing magnetic recording and reproducing device is used, the shape of the recorded marks can be made substantially rectangular. Accordingly, if the foregoing magnetic recording and reproducing device is used, a signal can be read out from recorded marks recorded in substantially rectangular shape, crosstalk from adjacent recorded bits in the track direction can be suppressed, and accurate recording and reproducing can be performed.

Further, with the foregoing structure, since the area whose temperature is increased by the local temperature increasing means is not the actual domain for recording, but the surrounding domain, the size of the domain for recording is not limited by the width of the local temperature increasing means (the diameter of a light beam spot, etc.).

(vii) The recording and reproducing device in (vi) above preferably also includes a magnetic reproducing head and local temperature increasing means for reproducing, which increase the temperature of the recording medium in a domain thereof opposite the magnetic reproducing head but excluding a domain to be reproduced, to the vicinity of a magnetic compensation temperature thereof.

With this structure, by increasing the temperature of a domain opposite the magnetic head but excluding a domain to be reproduced, information recorded by the foregoing recording and reproducing device can be reproduced with residual magnetization of domains other than the domain to be reproduced substantially at zero. Accordingly, with this structure, even if the width of the magnetic reproducing head is greater than the width of the domain to be reproduced, information recorded in the domain for reproducing can be selectively reproduced, and crosstalk can be reduced.

Further, since recorded marks recorded by the foregoing recording and reproducing device are substantially rectangular, accurate reproducing can be performed using a typical magnetic head, without using a crescent-shaped magnetic head, as conventionally.

(viii) In the recording and reproducing device in (vii) above, it is preferable if the domain whose temperature is increased by said local temperature increasing means for reproducing is made up of domains adjacent to the domain to be reproduced, on both sides thereof, and if the magnetic reproducing head has a width of less than three times a width of each domain of increased temperature adjacent to the domain to be reproduced.

If the width of the magnetic reproducing head is set to less than three times the width of each domain of increased temperature adjacent to the domain to be reproduced, the width of the domain whose temperature is not increased (i.e., the domain to be reproduced) will be smaller than the width of the local temperature increasing means (the diameter of a light beam spot, width of a heater, etc.). Accordingly, with this structure, information can be reproduced from a domain narrower than the width of the local temperature increasing means (the diameter of a light beam spot, etc.), the width of the magnetic reproducing head, etc. This facilitates manufacture of the magnetic reproducing head, and is advantageous in reducing track width and increasing recording density.

(ix) In the magnetic recording and reproducing device in (vii) or (viii) above, it is preferable if the magnetic reproducing head and the local temperature increasing means for reproducing are both provided on the same side of the recording medium, and if the magnetic reproducing head is provided after the local temperature increasing means for reproducing with respect to a direction of motion of the recording medium.

If the magnetic head and the local temperature increasing means are provided on the same side of the recording medium and the magnetic head is provided after the local temperature increasing means with respect to the direction of motion of the recording medium, the magnetic head can perform reproducing immediately after heating by the local temperature increasing means. In this case, heating and cooling can be performed efficiently, and the width of the domain of increased temperature on the recording medium does not become overly large.

(x) In the recording and reproducing device in any one of (vii) through (ix) above, the domain of the recording medium whose temperature is increased by the local temperature increasing means for reproducing is preferably set so as to be larger than the domain whose temperature is increased by the local temperature increasing means for recording.

Domains bordering on the domain for recording are prone to becoming magnetically disordered during recording. With the foregoing structure, since the domain whose temperature is increased by the local temperature increasing means for reproducing is set larger than the domain whose temperature is increased by the local temperature increasing means for recording, information can be reproduced from a domain smaller than the domain for recording. Accordingly, with this structure, by not reproducing domains bordering on the domain for recording, it is possible to perform reproducing of narrow tracks, without influence from the foregoing magnetic disorder.

(xi) In the magnetic recording device of any one of (vii) through (x) above, the local temperature increasing means are preferably light beam projecting means.

By using light beam projecting means as the local temperature increasing means, a narrow domain can easily be increased in temperature. In addition, it is possible to change the width and temperature of the domain of increased temperature by adjusting the power of the light beam. This means that the medium can easily be brought to the same residual magnetization with high repeatability, which is advantageous in always reproducing information from tracks of the same width.

(xii) In order to attain the foregoing objects, a magnetic recording method according to the present invention comprises the steps of (a) increasing a temperature of a recording medium, which has a recording layer made of ferrimagnetic material, in a domain thereof opposite a magnetic head but excluding a domain for recording, and (b) applying to the recording medium an external magnetic field smaller than a coercive force of the domain of increased temperature, and greater than a coercive force of the domain for recording opposite the magnetic head.

The recording medium made of ferrimagnetic material has a magnetic compensation point, and coercive force increases with increase in temperature. At the magnetic compensation point, residual magnetization is zero, and coercive force is infinite. Accordingly, as specified above, by applying a magnetic field smaller than the coercive force in the domain of increased temperature, and greater than the coercive force of the domain for recording (i.e., its coercive force at room temperature), it is possible to record information solely in the domain for recording. In other words, since the external magnetic field applied is less than the coercive force in the domain of increased temperature, recording is not performed in the domain of increased temperature. In the domain for recording opposite the magnetic head, however, the external magnetic field applied is greater than the coercive force in the domain for recording, and thus the magnetization thereof is aligned with the external magnetic field, and recording is performed.

With the foregoing method, the domain whose temperature is increased is a domain other than the domain for recording. Accordingly, with the foregoing method, the temperature distribution rarely extends to the actual domain for recording, and thus the shape of the recorded marks can be made substantially rectangular, thus reducing crosstalk.

(xiii) In the magnetic recording method in (xii) above, the domain whose temperature is increased is preferably made up of domains adjacent to the domain for recording, on both sides thereof.

With this method, by increasing the temperature of domains on both sides of the domain for recording, the domain of increased temperature can be made smaller. For example, when the foregoing local temperature increasing means are light beam projecting means, the diameter of the light beam spot can be decreased, and the domains of increased temperature can be finely controlled.

(xiv) In the magnetic recording method in (xiii) above, it is preferable to heat the recording medium such that the width of each domain of increased temperature adjacent to the domain for recording has a width of more than ⅓ the width of the magnetic head.

If the width of each domain of increased temperature adjacent to the domain for recording is set to more than ⅓ the width of the magnetic head, the width of the domain not heated, i.e. of the domain for recording, will be less than the width of the local temperature increasing means (the diameter of a light beam spot, width of a heater, etc.). Accordingly, with this method, recording can be performed in domains narrower than the local temperature increasing means (diameter of a light beam spot, width of a heater, etc.) or the magnetic head. Accordingly, with this method, track width can be reduced and recording density can be increased.

(xv) In the magnetic recording method in either (xii) or (xiii) above, the temperature increasing step (a) is preferably performed by projection of a light beam.

By performing the temperature increasing step (a) by projecting a light beam, a narrow domain can easily be increased in temperature. In addition, it is possible to change the width and temperature of the domain of increased temperature by adjusting the power of the light beam. This means that the medium can easily be brought to the same coercive force with high repeatability, which is advantageous in forming tracks of equal width.

Additional objects, features, and strengths of the present invention will be made clear by the description below. Further, the advantages of the present invention will be evident from the following explanation in reference to the drawings.

BEST MODE FOR CARRYING OUT THE INVENTION

The following embodiments will explain the present invention in further detail, but the present invention is not limited in any way thereby.

FIRST EMBODIMENT

The following will explain one embodiment of the present invention with reference to FIGS. 1 through 5.

Figure 2:
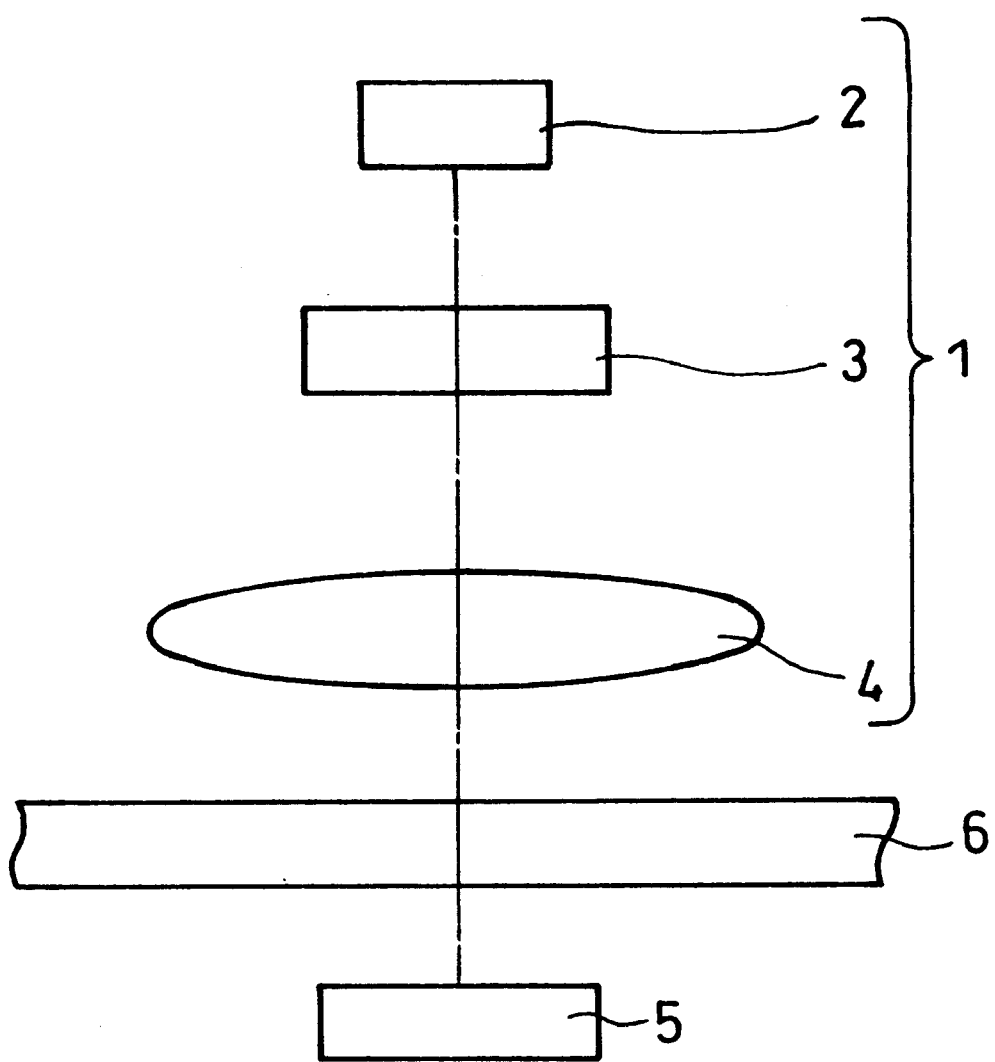
FIG. 2 is a schematic structural drawing of the foregoing magnetic recording and reproducing device.

As shown in FIG. 2, a magnetic recording and reproducing device according to the present embodiment is provided with an optical head 1, which includes a laser light source 2 as local temperature increasing means (light beam projecting means), a diffractive element 3, and an objective lens 4; and with a magnetic head 5.

The laser light source 2 is used as a recording laser light source and as a reproducing laser light source, and is, for example, a semiconductor laser of 650 nm wavelength. The objective lens 4 is a convex lens capable of converging light, and has a numerical aperture of around 0.4 to 0.6. The magnetic head 5 is used as a magnetic recording head and as a magnetic reproducing head. Further, the laser light source 2, the diffractive element 3, the objective lens 4, and the magnetic head 5 are provided, in that order, along a common optical axis.

In this type of recording and reproducing device, laser light projected from the laser light source 2 is divided by the diffractive element 3 into two beams of first-order diffracted light, which, passing through the objective lens 4, are converged, as two laser beams, onto respective domains of a recording medium 6 (to be discussed below) which are adjacent to a domain for recording or a domain to be reproduced.

In the foregoing recording and reproducing device, the recording medium 6 is provided between the optical head 1 and the magnetic head 5, more specifically, between the objective lens 4 of the optical head 1 and the magnetic head 5.

Figure 3:
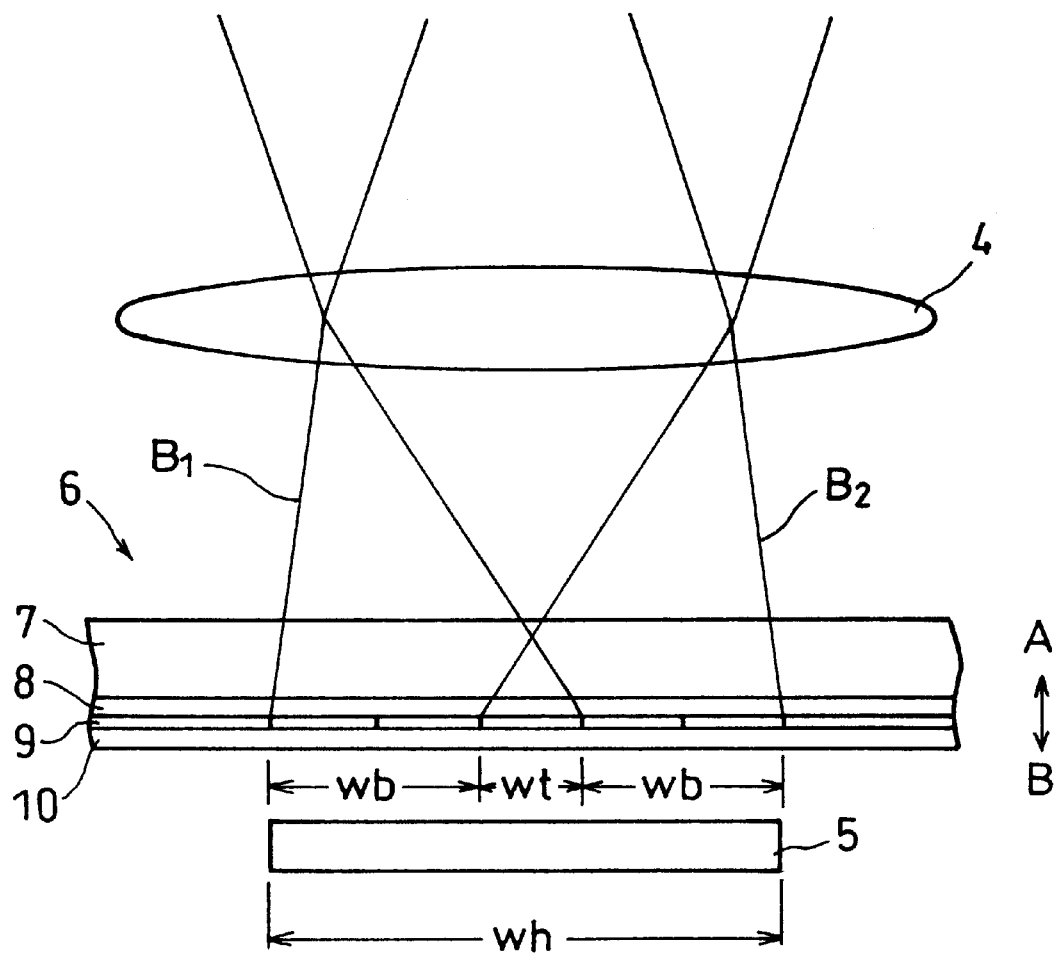
FIG. 3 is a drawing explaining operations when performing recording or reproducing using the magnetic recording and reproducing device shown in FIG. 2.

As shown in FIG. 3, the recording medium 6 has a structure in which a transparent dielectric film 8, a recording layer 9, and a protective layer 10 are laminated, in that order, on a substrate 7, which has a texture which prevents sticking of the magnetic head 5.

The transparent dielectric film 8 is made of aluminum nitride (AlN), and prevents reflection of light and improves the efficiency of temperature increase.

Figure 4:
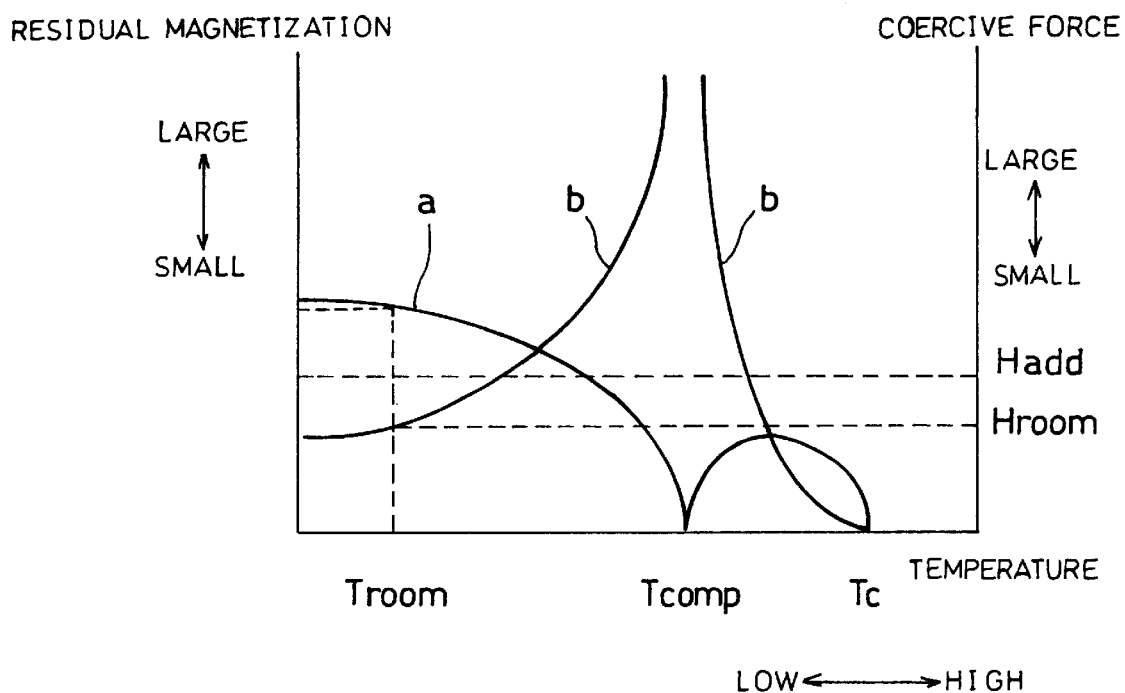
FIG. 4 is a graph showing relationships between residual magnetization and temperature, and between coercive force and temperature, in a ferrimagnetic material.

The recording layer 9 is made of a ferrimagnetic material having a magnetic compensation temperature. As shown in FIG. 4, coercive force, shown by a curve b, increases with increase in temperature, and when the temperature reaches the magnetic compensation temperature (Tcomp), coercive force (the coercive force at the magnetic compensation temperature; Hcomp) is infinite, and residual magnetization, shown by curve a, is substantially zero.

For the foregoing ferrimagnetic material, it is preferable to use a material which, at room temperature (Troom; approx. 25° C.), has residual magnetization (Mroom) of more than 100 (emu/cc) (0.126 T) and coercive force (Hroom) of 500 (oe) ($3.98 \times 10^4$ A/m) or more, and which has a magnetic compensation temperature of around 100° C.–250° C. Examples of materials which fulfill the foregoing conditions include TbCo, DyCo, GdCo, TbFeCo, DyFeCo, GdFeCo, GdTbFeCo, GdDyFeCo, etc. However, the material used is not limited to any particular material, and the composition thereof may be adjusted in order to obtain a desired ferrimagnetic material.

Further, for the foregoing ferrimagnetic material, it is preferable to use an amorphous ferrimagnetic material, and, among these, it is even more preferable to use a rare earth-transition metal ferrimagnetic material. The advantage of amorphous ferrimagnetic materials is that medium noise is lower than with crystalline ferrimagnetic materials.

The protective layer 10 is made of aluminum nitride (AlN), and prevents oxidation of the recording layer 9. In other words, the protective layer 10 also serves as an oxidation preventing film. The transparent dielectric layer 8, the recording layer 9, and the protective layer 10 are provided with thicknesses of 80 nm, 100 nm, and 20 nm, respectively. Further, on the protective layer 10 is laminated, as necessary, a lubricating layer (not shown). The recording medium is positioned so that the side of the substrate 7 provided with the transparent dielectric layer 8, the recording layer 9, and the protective layer 10 faces the magnetic head 5.

The following will explain a method of recording information in the recording medium 6 using the recording and reproducing device with the foregoing structure.

In order to record information in the recording medium 6, first, laser light is projected by the laser light source 2 toward the diffractive element 3. The output of the laser light source 2 at this time is set such that domains Tr1 and Tr2 (shown by hatching in FIG. 1) of the recording medium 6, opposite the magnetic head 5 and adjacent to a domain for recording (a track Tr to be recorded) on both sides thereof, are heated to a temperature at which the coercive force of the domains Tr1 and Tr2 is greater than the coercive force of the domain for recording (its coercive force at room temperature; Hroom), or, preferably, to the vicinity of the magnetic compensation temperature (preferably, within ±50° of the magnetic compensation temperature), or, more preferably, to approximately the magnetic compensation temperature. Specifically, when a rare earth-transition metal ferrimagnetic material with a magnetic compensation temperature of approximately 150° C. is used for the recording layer 9, it is preferable to set the output of the laser light source 2 such that the temperature of the domains Tr1 and Tr2 is increased to within a range of 100° C. through 200° C. In the explanation below, it will be assumed that the output of the laser light source 2 is set so as to heat the domains Tr1 and Tr2 to the vicinity of the magnetic compensation temperature.

The laser light projected from the laser light source 2 is divided by the diffractive element 3, weakening the zero-order diffracted light, and, as shown in FIG. 3, projecting two beams of first-order diffracted light into the objective lens 4. Then, each beam of first-order diffracted light is converged by the objective lens 4, and focused, as laser beams $B_1$ and $B_2$, onto domains $\beta 1$ and $\beta 2$ of the recording medium 6 (see FIG. 1), which include the domains Tr1 and Tr2 opposite the magnetic head 5 and adjacent to the domain for recording (the track Tr to be recorded).

In this way, in the domains $\beta 1$ and $\beta 2$, the temperature of the domains Tr1 and Tr2, which are opposite the magnetic head 5, is increased to the vicinity of the magnetic compensation temperature. Accordingly, in the domains Tr1 and Tr2, as shown in FIG. 4, coercive force increases with the increase in temperature.

Meanwhile, the track Tr, which is the domain for recording, remains substantially at room temperature. Accordingly, there is a difference in coercive force between the recording domain Tr0 (that portion of the track Tr which is opposite the magnetic head 5; see FIG. 1) and the domains Tr1 and Tr2 adjacent to the recording domain Tr0.

Then, by applying an external magnetic field (Hadd) greater than the coercive force (Hroom) of the recording domain Tr0 of the track Tr, but less than the coercive force (Hcomp, for example) of the domains Tr1 and Tr2 adjacent to the recording domain Tr0, in accordance with the information to be recorded (alternating, for example, in FIG. 3, between upward magnetization (in the direction of arrow A, toward the substrate 7 of the recording medium 6) and downward magnetization (in the direction of the arrow B)), the magnetic head 5 records predetermined information solely in the track Tr to be recorded.

In other words, in the domains Tr1 and Tr2 whose temperature is increased by the laser beams $B_1$ and $B_2$, since the external magnetic field applied is less than the coercive force of the domains Tr1 and Tr2, recording is not performed. In the recording domain Tr0, on the other hand, since the external magnetic field applied is greater than the coercive force of the recording domain Tr0, the magnetization thereof is aligned with the external magnetic field, and recording can be performed.

Conventionally, when performing recording using a recording medium made of ferrimagnetic material, the temperature of a track to be recorded was increased to the vicinity of the Curie temperature (Tc) by projecting a light beam along the track, and, with the coercive force of the track to be recorded at zero, recording was performed by applying an external magnetic field. However, with this conventional method, since the temperature of the actual track to be recorded is increased, the influence of temperature distribution therein resulted in recorded marks which were in the form of crescents.

However, in the present embodiment, as discussed above, the domains whose temperature is increased during recording are domains adjacent to the track Tr to be recorded (the domain for recording), and the temperature distribution rarely extends to the track Tr to be recorded. For this reason, in the present embodiment, the recorded marks can be prevented from becoming crescent-shaped, as they did conventionally due to the influence of temperature distribution, and can be made substantially rectangular in shape. Accordingly, in the present embodiment, crosstalk between adjacent recorded bits in the track direction can be prevented.

Further, in the present embodiment, since the temperature is increased in domains adjacent to the domain for recording, the size of the domain for recording (for instance, the track width), unlike conventionally, is not limited by the size of the domain of increased temperature, i.e., the diameter of the light beam spot (the laser beams $B_1$ and $B_2$), or to the size of the magnetic head 5. In other words, since, conventionally, a domain onto which the light beam was projected, and which was opposite the magnetic recording head, was the domain for recording, in order to increase recording density, it was necessary to decrease, as much as possible, the diameter of the light beam spot or the size of the magnetic recording head. However, there are limits to development of this type of light beam projecting device and magnetic recording head, and such development costs money.

In the present embodiment, in contrast, since the temperature is increased, not in the actual domain for recording, but in domains adjacent thereto, information can easily be recorded in domains with a track width narrower than conventionally, using existing light beam projecting devices and magnetic recording heads.

Figure 1:
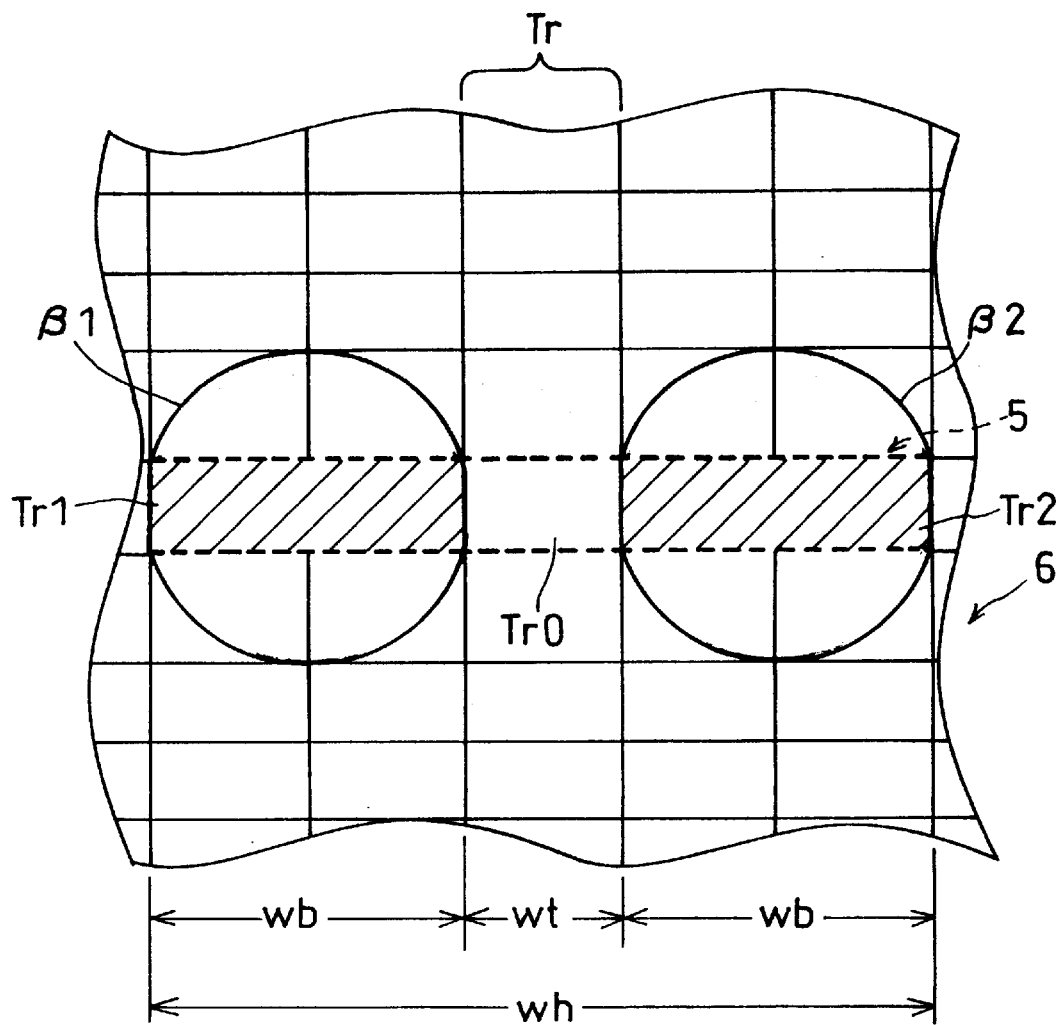
FIG. 1 is an explanatory drawing showing the relationship between a domain for recording or reproducing and domains of increased temperature in a recording medium when performing recording or reproducing using a magnetic recording and reproducing device according to one embodiment of the present invention.

In other words, as shown in FIGS. 1 and 3, if wt is the width of the domain for recording (track width of the track Tr to be recorded), wh the width of the magnetic head 5, and wb the width of each domain $\beta 1$ and $\beta 2$ which are the domains whose temperature is increased by the laser beams $B_1$ and $B_2$ (equal to the width of each of the domains Tr1 and Tr2, and to the diameter of the spot of each laser beam $B_1$ and $B_2$), then, by setting wh to less than three times wb, information can be recorded in a track of a desired width (wt) which is less than the width of the magnetic head 5 (wh) and less than the diameter of the spot of each of the laser beams $B_1$ and $B_2$ (wb). When wh is equal to three times wb, the width of the domain for recording (wt) is equal to the diameter of the spot of each laser beam $B_1$ and $B_2$ (wb), or greater than that diameter. Further, when wh is greater than three times wb, the width of the domain for recording (wt) is greater than the diameter of the spot of each laser beam $B_1$ and $B_2$ (wb).

Incidentally, in the present embodiment, the respective widths of the domain for recording, the magnetic head 5, the domains $\beta 1$ and $\beta 2$, and the domains Tr1 and Tr2 are their widths in the direction of track width, perpendicular to the track direction. In what follows, "width" will mean width in the direction of track width, unless otherwise specified.

Figure 5:
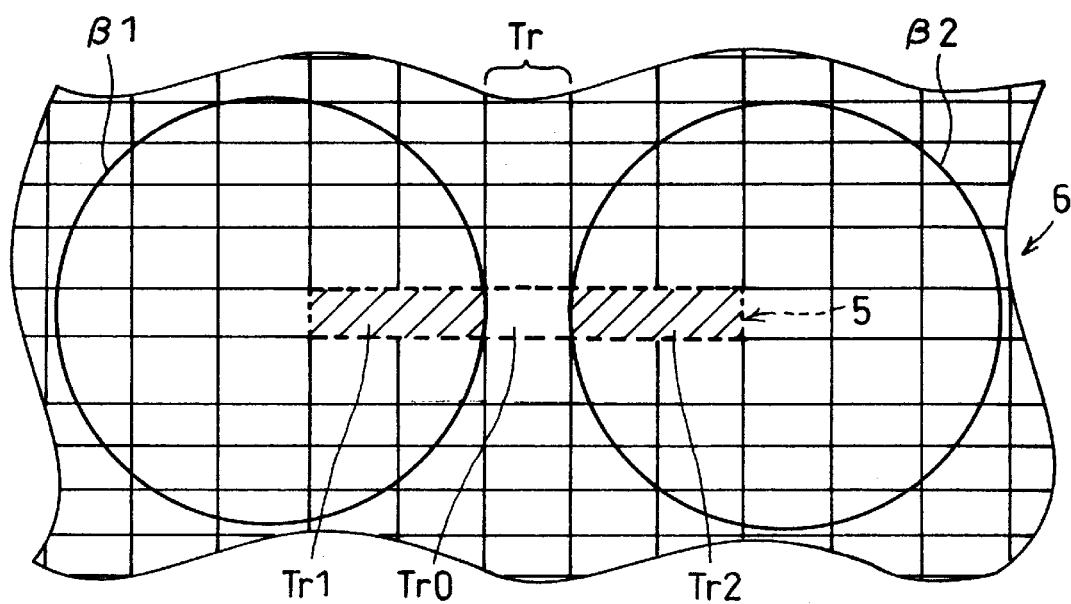
FIG. 5 is another explanatory drawing showing the relationship between a domain for recording or reproducing and domains of increased temperature in a recording medium when performing recording or reproducing using the magnetic recording and reproducing device shown in FIG. 2.

Further, in FIGS. 1 and 3, the width (wb) of each of the domains $\beta 1$ and $\beta 2$ whose temperatures are increased by the laser beams $B_1$ and $B_2$ is smaller than the width of the magnetic head 5 (wh), but there is no limitation to this structure. For example, a structure may be used in which, as shown in FIG. 5, the width (wb) of each of the domains $\beta 1$ and $\beta 2$ whose temperatures are increased by the laser beams $B_1$ and $B_2$ is greater than or equal to the width of the magnetic head 5 (wh). In other words, it is sufficient if the domains $\beta 1$ and $\beta 2$ whose temperatures are increased by the laser beams $B_1$ and $B_2$ are domains of the recording medium which are adjacent to the domain for recording, and which include domains opposite the magnetic head 5.

As discussed above, in the present embodiment, by increasing the temperature of domains adjacent to the domain for recording, and by setting wh to less than three times wb, i.e., by projecting the laser beams $B_1$ and $B_2$ such that the width of each of the domains Tr1 and Tr2 (wb) is greater than ⅓ of the width of the magnetic head 5 (wh), information can be easily recorded in a domain with a track width narrower than conventionally. Further, in the present embodiment, by varying, as necessary, the diameter of the spot of each laser beam $B_1$ and $B_2$ (wb) in combination with the width of the magnetic head 5 (wh), the width of the domain for recording (wt) can be set to a desired size, and can be set easily.

The following will explain a method of reproducing information recorded in the recording medium 6 using the recording and reproducing device with the foregoing structure. The following explanation will discuss reproducing of information recorded in the foregoing track Tr.

In order to reproduce information recorded in the recording medium 6, first, laser light is projected by the laser light source 2 toward the diffractive element 3, which weakens the zero-order diffracted light thereof and divides the laser light into two beams of first-order diffracted light.

The output of the laser light source 2 at this time is set such that domains Tr1 and Tr2 of the recording medium 6, opposite the magnetic head 5 and adjacent to a domain to be reproduced (a track Tr to be reproduced) on both sides thereof, are heated to a temperature in the vicinity of the magnetic compensation temperature (preferably, within ±30° of the magnetic compensation temperature), or, more preferably, to approximately the magnetic compensation temperature.

Specifically, when a ferrimagnetic material with a magnetic compensation temperature of approximately 150° C. is used for the recording layer 9, it is preferable to set the output of the laser light source 2 during reproducing such that the temperature of the first domain Tr1 and the second domain Tr2 is increased to within a range of 120° C. through 180° C.

Accordingly, if the output of the laser light source 2 during recording is also adjusted such that the temperature of the domains Tr1 and Tr2 is increased to the vicinity of the magnetic compensation temperature, as discussed above, a laser light source 2 can be used which has the same output during recording and reproducing. Thus the system structure can be simplified.

Next, the respective beams of first-order diffracted light projected from the diffractive element 3, as shown in FIG. 3, pass through the objective lens 4, and are focused thereby, as laser beams $B_1$ and $B_2$, onto domains $\beta 1$ and $\beta 2$ of the recording medium 6, which include the domains Tr1 and Tr2 opposite the magnetic head 5 and adjacent to the domain to be reproduced (the track Tr to be reproduced).

In this way, in the domains $\beta 1$ and $\beta 2$, the temperature of the domains Tr1 and Tr2, which are opposite the magnetic head 5, is increased to the vicinity of the magnetic compensation temperature. As a result, residual magnetization in the domains Tr1 and Tr2 is reduced substantially to zero.

Meanwhile, the track Tr, which is the domain to be reproduced, remains substantially at room temperature. Accordingly, as shown in FIG. 4, sufficient residual magnetization remains in the track Tr. The magnetic head 5 senses the magnetic field produced by the recording medium 6 as a change in resistance, which the magnetic head 5 outputs as a voltage change. Thus, information can be reproduced without the influence of crosstalk from adjacent tracks (such as crosstalk from the domains Tr1 and Tr2).

Further, in the present embodiment, as discussed above, the recorded marks are substantially rectangular in shape, and thus recorded information can be accurately reproduced without using a magnetic head of crescent shape.

In addition, as shown in FIGS. 1 and 3, if wt is the width of the domain to be reproduced (track width of the track Tr to be reproduced), wh the width of the magnetic head 5, and wb the width of each domain $\beta 1$ and $\beta 2$ which are the domains whose temperature is increased by the laser beams $B_1$ and $B_2$ (equal to the width of each of the domains Tr1 and Tr2, and to the diameter of the spot of each laser beam $B_1$ and $B_2$), then, by setting wh to less than three times wb, information can be reproduced from a track whose width (wt) is less than the width of the magnetic head 5 (wh) and less than the diameter of the spot of each of the laser beams $B_1$ and $B_2$ (wb).

In other words, in the present embodiment, by setting wh to less than 3 times wb, i.e., by projecting the laser beams $B_1$ and $B_2$ such that the width of each of the domains Tr1 and Tr2 (wb) is more than ⅓ of the width of the magnetic head 5 (wh), information can be reproduced from a track of desired width (wt) which is less than the width of the magnetic head 5 (wh) and less than the diameter of the spot of each of the laser beams $B_1$ and $B_2$ (wb).

Again, by, for example, adjusting the diameter (wb) of the spot of each laser beam $B_1$ and $B_2$, the width of the domain to be reproduced can be made smaller than the width of the recorded track Tr, thus enabling low-noise reproducing.

In the present and subsequent embodiments, the "domain of increased temperature" during reproducing is a domain whose temperature is increased to the vicinity of the magnetic compensation temperature, but the "domain of increased temperature" during recording is a domain whose temperature is increased so it has a coercive force greater than that of the domain for recording.

Incidentally, in the present embodiment, a single laser light source 2 was used to increase the temperature of the recording medium 6 during both recording and reproducing, but light beam projecting means for recording (local temperature increasing means for recording) and light beam projecting means for reproducing (local temperature increasing means for reproducing) may also be provided separately. Further, in the present embodiment, the diffraction element 3 was used to divide the laser light projected by the laser light source 2 into two beams of first-order diffracted light, but, instead of using a diffraction element 3, two laser light sources, for example, may be used to project laser light onto the domains on both sides of the domain for recording or the domain to be reproduced.

Further, the present embodiment discussed a structure for increasing the temperature of domains on both sides of the domain for recording or the domain to be reproduced, but increase of the temperature of domains on both sides of the domain for recording or the domain to be reproduced is not necessarily required. In the present embodiment, the domain recorded or reproduced (the recording domain/reproducing domain Tr0) is that domain opposite the magnetic head 5 whose temperature is not increased.

Accordingly, the foregoing local temperature increasing means for recording and local temperature increasing means for reproducing are not limited to any particular means, provided they are capable of increasing the temperature of the recording medium 6 in a domain thereof opposite the magnetic head 5, but excluding the domain for recording. One example of such local temperature increasing means is a temperature increasing device using heat radiation from a heating element, such as a miniature heater which makes use of joule heat.

Moreover, when the domain for recording is, for example, one side of the domain of the recording medium opposite the magnetic head 5, the domain of increased temperature may be provided only on one side of the domain for recording. However, in this case, the domain of increased temperature is larger than when the temperature is increased in domains on both sides of the domain for recording. For example, when a light beam (the laser beams $B_1$ and $B_2$) is projected on one side of the domain for recording, the diameter of the light beam spot must be larger than when the light beam is projected on both sides of the domain for recording.

In contrast, the advantages of increasing the temperature in domains Tr1 and Tr2 adjacent to the domain for recording on both sides thereof are that the size of the light beam spot can be reduced, and fine control of the domain of increased temperature can be exercised.

Further, to simplify explanation, the present embodiment explained a structure in which both recording and reproducing are performed by a single magnetic head 5, but a magnetic recording head and a magnetic reproducing head may also be provided separately. For the magnetic head 5, in addition to a ring type magnetic head, a so-called single-pole type magnetic head may also be used. In this case, the width of the head is the width of the main pole.

Further, when a magnetic recording head and a magnetic reproducing head are provided separately, for the magnetic reproducing head, in addition to a magnetic head which uses a coil, a magnetic head which uses a magnetoresistive element, for example, may be used.

Again, the present embodiment explained a structure which uses a light beam for reproducing, but the light beam projecting means for reproducing (local temperature increasing means for reproducing) may be omitted, and reproducing performed using a magnetic reproducing head narrower than the recorded track.

In other words, the present embodiment explained a magnetic recording and reproducing device which includes a magnetic recording device provided with the laser light source 2 as a laser light source for recording and the magnetic head 5 as a magnetic recording head, in which the laser light source 2 also serves as a laser light source for reproducing, and the magnetic head 5 also serves as a magnetic reproducing head. However, by using the laser light source 2 only as a laser light source for recording, and the magnetic head 5 only as a magnetic recording head, the device with the foregoing structure may be used as a magnetic recording device.

The present embodiment used the transparent dielectric layer 8, but this layer may be omitted in certain cases. Further, the present embodiment used a protective layer 10 made of AlN, but this layer may be a film of material is acceptable which has superior resistance to friction and oxidation. Examples of such a film include films made of carbon materials such as amorphous carbon and diamond-like carbon.

SECOND EMBODIMENT

Figure 6:
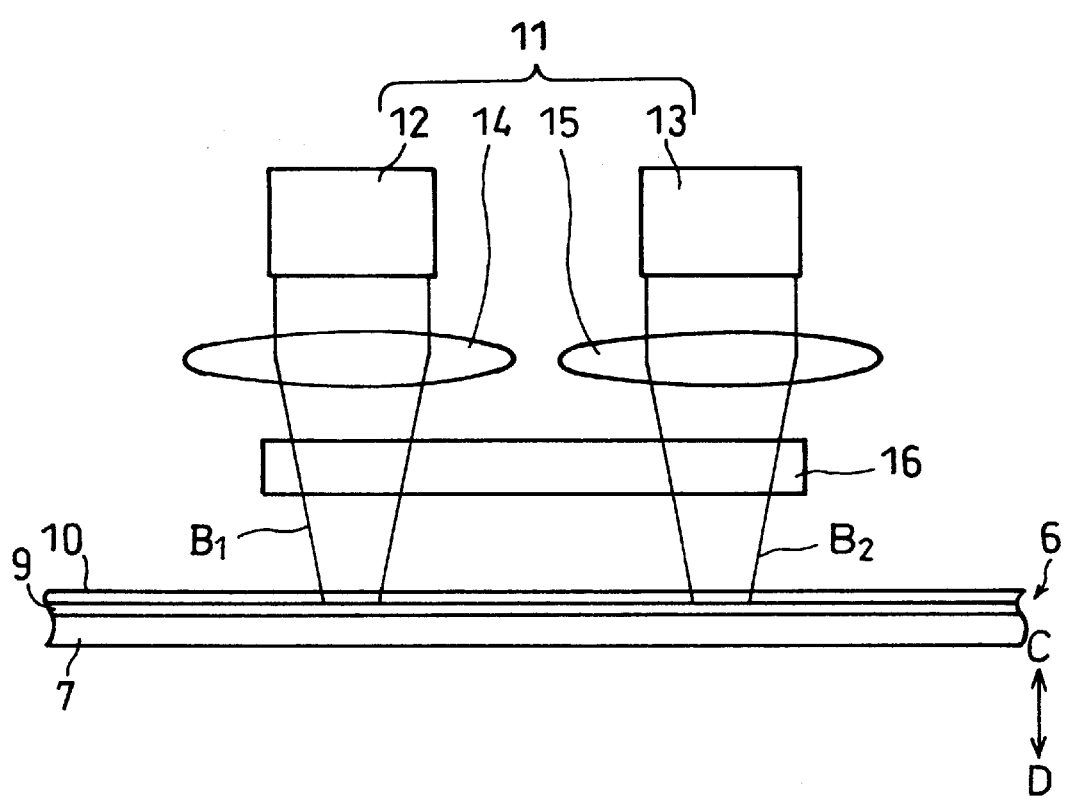
FIG. 6 is a schematic structural drawing of a magnetic recording and reproducing device according to another embodiment of the present invention.
Figure 7:
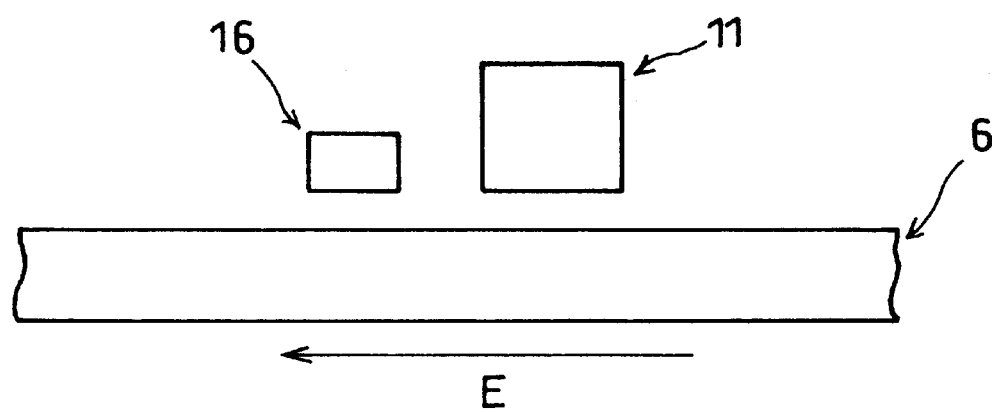
FIG. 7 is an explanatory drawing showing the relative positions of an optical head and a magnetic head of the magnetic recording and reproducing device shown in FIG. 6.
Figure 8:
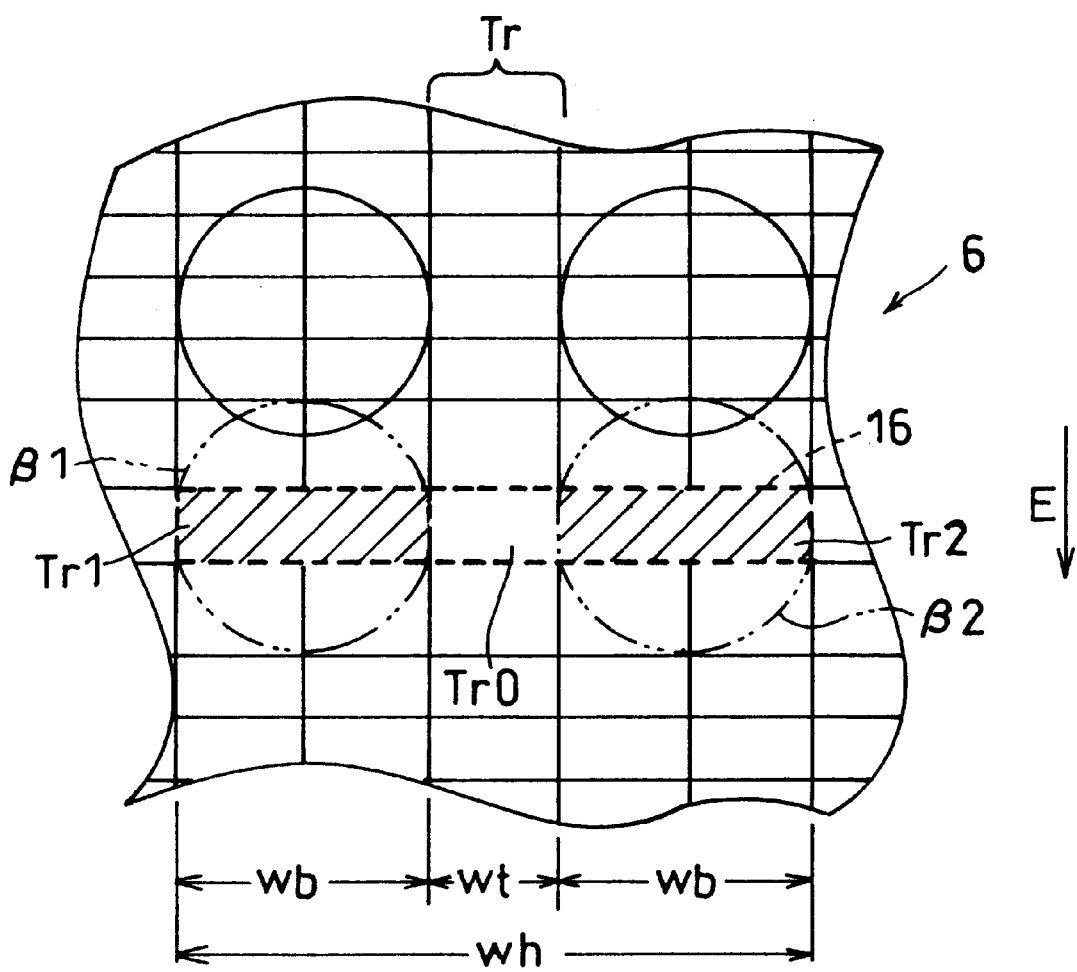
FIG. 8 is an explanatory drawing showing the relationship between a domain for recording or reproducing and domains of increased temperature in a recording medium when performing recording or reproducing using the magnetic recording and reproducing device shown in FIG. 6.

The following will explain another embodiment of the present invention with reference to FIGS. 6 through 8. For ease of explanation, structural elements having the same functions as those of the first embodiment above will be given the same reference symbols, and explanation thereof will be omitted here. The following will chiefly explain the differences between the present embodiment and the first embodiment above.

As shown in FIG. 6, a magnetic recording and reproducing device according to the present embodiment is provided with an optical head 11, which includes laser light sources 12 and 13 as local temperature increasing means (light beam projecting means), and objective lenses 14 and 15; and with a magnetic head 16.

The laser light sources 12 and 13 are used as recording laser light sources and as reproducing laser light sources, and are, for example, semiconductor lasers of 650 nm wavelength. The objective lenses 14 and 15 are convex lenses capable of converging light, and have a numerical aperture of around 0.4 to 0.6. The magnetic head 16 is used as a magnetic recording head and as a magnetic reproducing head.

In this type of recording and reproducing device, laser light projected by the laser light sources 12 and 13, passing through the objective lenses 14 and 15, respectively, are converged, as two laser beams, onto domains of the recording medium 6 which are adjacent to a domain for recording or a domain to be reproduced.

In the present embodiment, the optical head 11 and the magnetic head 16 are provided on the same side of the recording medium 6. In this case, the optical head 11 and the magnetic head 16 are not provided along a common optical axis, but are provided such that, as shown in FIG. 7, the magnetic head 16 follows the optical head 11 with respect to a direction of motion of the recording medium 6 (the direction of the arrow E), i.e., is in the downstream recording medium motion direction.

Incidentally, the recording medium 6 here has a structure equivalent to that of the first embodiment, except that it is not provided with the transparent dielectric film 8 (anti-reflection layer). The recording medium 6 is positioned so that the side of the substrate 7 provided with the recording layer 9 and the protective layer 10 faces the magnetic head 16.

The following will explain a method of recording information in the recording medium 6 using the recording and reproducing device with the foregoing structure.

In order to record information in the recording medium 6, first, laser light is projected by the laser light sources 12 and 13 toward the objective lenses 14 and 15, respectively. As in the first embodiment above, the output of the laser light source 2 at this time is set such that domains Tr1 and Tr2 (see FIG. 8) of the recording medium 6, opposite the magnetic head (the magnetic head 16) and adjacent to a domain for recording (a track Tr to be recorded; see FIG. 8) on both sides thereof, are heated to a temperature at which the coercive force of the domains Tr1 and Tr2 is greater than the coercive force of the domain for recording (its coercive force at room temperature; Hroom), or, preferably, to the vicinity of the magnetic compensation temperature, or, more preferably, to the magnetic compensation temperature. In the explanation below, it will be assumed that the respective outputs of the laser light sources 12 and 13 are set so as to heat the domains Tr1 and Tr2 to the vicinity of the magnetic compensation temperature.

The laser light projected from the respective laser light sources 12 and 13 is, as shown in FIG. 6, converged by the objective lenses 14 and 15, respectively, and focused, as laser beams $B_1$ and $B_2$, onto domains of the recording medium 6 adjacent to the domain for recording (the track Tr to be recorded).

The temperature of the domains onto which the respective laser beams are projected immediately after projection thereof is greater than the magnetic compensation temperature. As a result, as shown in FIG. 8, there are, in the recording medium 6, domains of increased temperature (domains β1 and β2) adjacent to the track Tr to be recorded. Further, domains Tr1 and Tr2 of the recording medium 6, adjacent to the track Tr to be recorded, and opposite the magnetic head 16 (which is provided so as to follow the laser light sources 12 and 13 with respect to the direction of motion of the recording medium), remain at a temperature in the vicinity of the magnetic compensation temperature (they remain heated due to retained heat).

Meanwhile, the track Tr to be recorded remains substantially at room temperature. Accordingly, there is a difference in coercive force between the recording domain Tr0 (that portion of the track Tr which is opposite the magnetic head 16) and the domains Tr1 and Tr2 adjacent to the recording domain Tr0.

Then, by applying an external magnetic field (Hadd) greater than the coercive force (Hroom) of the recording domain Tr0 of the track Tr, but less than the coercive force (Hcomp, for example) of the domains Tr1 and Tr2 adjacent to the recording domain Tr0, in accordance with the information to be recorded (alternating, for example, in FIG. 6, between upward magnetization (in the direction of arrow C, from the substrate 7 toward the recording layer 9 and the protective layer 10) and downward magnetization (in the direction of the arrow D)), the magnetic head 16 records predetermined information solely in the track Tr to be recorded.

The following will explain a method of reproducing information recorded in the recording medium 6 using the recording and reproducing device with the foregoing structure. The following explanation will discuss reproducing of information recorded in the foregoing track Tr.

In order to reproduce information recorded in the recording medium 6, first, laser light is projected by the laser light sources 12 and 13 toward the objective lenses 14 and 15, respectively. The output of the laser light sources 12 and 13 at this time is set such that domains Tr1 and Tr2 of the recording medium 6, opposite the magnetic head 16 and adjacent to a domain to be reproduced (a track Tr to be reproduced) on both sides thereof, are heated to a temperature in the vicinity of the magnetic compensation temperature, or, more preferably, to approximately the magnetic compensation temperature.

The laser light projected from the respective laser light sources 12 and 13 passes through the objective lenses 14 and 15, respectively, and is projected, as laser beams $B_1$ and $B_2$, onto domains of the recording medium 6 adjacent to the domain to be reproduced (the track Tr to be reproduced).

The temperature of the domains onto which the respective laser beams are projected immediately after projection thereof is greater than the magnetic compensation temperature. As a result, as shown in FIG. 8, there are, in the recording medium 6, domains of increased temperature (domains β1 and β2) adjacent to the track Tr to be recorded. Further, domains Tr1 and Tr2 of the recording medium 6, adjacent to the track Tr to be reproduced and opposite the magnetic head 16 (which is provided so as to follow the laser light sources 12 and 13 with respect to the direction of motion of the recording medium), remain at a temperature in the vicinity of the magnetic compensation temperature (they remain heated due to retained heat).

Meanwhile, the track Tr to be reproduced remains substantially at room temperature. Accordingly, sufficient residual magnetization remains in the track Tr, but the residual magnetization in the first domain Tr1 and the second domain Tr2 is substantially zero.

The magnetic head 16 senses the magnetic field produced by the recording medium 6 as a change in resistance, which the magnetic head 16 outputs as a voltage change. Thus, information reproducing can be performed without the influence of crosstalk from adjacent tracks (such as crosstalk from the domains Tr1 and Tr2).

As discussed above, in the present embodiment, the domains whose temperature is increased during recording are domains adjacent to the track Tr to be recorded (the domain for recording), and the temperature distribution rarely extends to the track Tr to be recorded. For this reason, in the present embodiment, the recorded marks can be prevented from becoming crescent-shaped, as they did conventionally due to the influence of temperature distribution, and they can be made substantially rectangular in shape. Accordingly, crosstalk among recorded bits can be prevented. Further, in the present embodiment, recorded information can be accurately reproduced without using a conventional crescent-shaped magnetic head.

Moreover, in the present embodiment, since the domains whose temperature is increased during recording or during reproducing are domains adjacent to the domain for recording or the domain to be reproduced, the size (track width) of the domain for recording and the domain to be reproduced, as in the first embodiment, is not limited to the size of the light beam spot (the laser beams $B_1$ and $B_2$), or to the size of the magnetic head 16.

In other words, as shown in FIG. 8, if wt is the width of the domain for recording (track width of the track Tr to be recorded), wh the width of the magnetic head 16, and wb the width of each domain $\beta 1$ and $\beta 2$ which are the domains whose temperature is increased by the laser beams $B_1$ and $B_2$ (equal to the width of each of the domains Tr1 and Tr2, and to the diameter of the spot of each laser beam $B_1$ and $B_2$), then, by setting wh to less than three times wb, information can be recorded in a track of a desired width (wt) which is less than the width of the magnetic head 16 (wh) and less than the diameter of the spot of each of the laser beams $B_1$ and $B_2$ (wb).

Accordingly, in the present embodiment, by setting wh to less than three times wb, i.e., by projecting the laser beams $B_1$ and $B_2$ such that the width of each of the first and second domains Tr1 and Tr2 (wb) is greater than ⅓ of the width of the magnetic head 16 (wh), information can easily be recorded in a domain with a track width narrower than conventionally. Further, in the present embodiment, by varying, as necessary, the diameter of the spot of each laser beam $B_1$ and $B_2$ (wb) in combination with the width of the magnetic head 16 (wh), the width of the domain for recording (wt) can be set to a desired size, and can be set easily.

In the same way, if wt is the width of the domain to be reproduced (track width of the track Tr to be reproduced), wh the width of the magnetic head 16, and wb the width of each domain $\beta 1$ and $\beta 2$ which are the domains whose temperature is increased by the laser beams $B_1$ and $B_2$ (equal to the width of each of the domains Tr1 and Tr2, and to the diameter of the spot of each laser beam $B_1$ and $B_2$), then, by setting wh to less than three times wb, information can be reproduced from a track of a desired width (wt) less than the width of the magnetic head 16 (wh) and less than the diameter of the spot of each of the laser beams $B_1$ and $B_2$ (wb).

Incidentally, in the present embodiment, the magnetic head 16 is provided so as to follow the optical head 11 with respect to the direction of motion of the recording medium 6 (the direction of the arrow E), but the magnetic head 16 may also be provided so as to precede the optical head 11 with respect to the direction of motion of the recording medium 6.

However, when the magnetic head 16 is provided so as to precede the optical head 11 with respect to the direction of motion of the recording medium 6 (upstream with respect to the recording medium motion direction), in order to record information in a predetermined domain for recording in the recording medium 6, after increasing the temperature of the domains adjacent to the domain for recording, the domains of increased temperature must retain a temperature higher than the domain for recording until one rotation of the recording medium 6 brings them to a position opposite the magnetic head. Further, in order to reproduce the foregoing information, the domains of increased temperature in the recording medium 6 must retain a temperature at or in the vicinity of the magnetic compensation temperature. Accordingly, when providing the magnetic head 16 upstream with respect to the direction of motion of the recording medium 6, it is necessary to increase the output of the laser light sources 12 and 13.

Accordingly, by providing the magnetic head 16 downstream with respect to the direction of motion of the recording medium 6, recording or reproducing can be performed immediately after heating by the laser beams $B_1$ and $B_2$, and thus heating and cooling can be performed efficiently, and the domains of increased temperature do not increase in width.

In addition, by providing the magnetic head 16 and the laser light sources 12 and 13 on the same side of the recording medium 6, the thickness of the magnetic recording and reproducing device in the direction of projection of the light beams (the laser beams $B_1$ and $B_2$) can be held to a minimum. Accordingly, with the foregoing structure, freedom in adjusting the focusing distance of the light beams can be increased, and the device can be reduced in size.

Further, in the present embodiment, the same laser light sources 12 and 13 were used to increase the temperature of the recording medium 6 during both recording and reproducing, but light beam projecting means for recording (local temperature increasing means for recording) and light beam projecting means for reproducing (local temperature increasing means for reproducing) may also be provided separately. Further, in the present embodiment, laser light projected by the laser light sources 12 and 13 was focused by the objective lenses 14 and 15, respectively, but, alternatively, a structure like that of the first embodiment, for example, may be used, in which laser light is projected from a single laser light source, divided into two beams of first-order diffracted light by a diffractive element, which are then converged by an objective lens and projected as two laser beams onto the domains on both sides of the track Tr to be recorded or reproduced.

Further, in the present embodiment, the domains of increased temperature were on both sides of the track Tr to be recorded or reproduced, but it is sufficient if the domain of increased temperature is a domain opposite the magnetic head 16 but excluding the domain to be recorded.

Further, the present embodiment, as well, to simplify explanation, explained a structure in which both recording and reproducing are performed by a single magnetic head 16, but a magnetic recording head and a magnetic reproducing head may also be provided separately. For the magnetic head 16, in addition to a ring type magnetic head, a so-called single-pole type magnetic head may also be used.

Further, when magnetic recording and reproducing heads are provided separately, for the magnetic reproducing head, in addition to a magnetic head which uses a coil, a magnetic head which uses a magnetoresistive element, for example, may be used. Again, the light source for reproducing may be omitted, and reproducing performed using a magnetic reproducing head narrower than the recorded track.

Further, the present embodiment explained a magnetic recording and reproducing device which includes a magnetic recording device provided with the laser light sources 12 and 13 as laser light sources for recording and the magnetic head 16 as a magnetic recording head, in which the laser light sources 12 and 13 also serve as laser light sources for reproducing, and the magnetic head 16 also serves as a magnetic reproducing head. However, by using the laser light sources 12 and 13 only as laser light sources for recording, and the magnetic head 16 only as a magnetic recording head, the device with the foregoing structure may be used as a magnetic recording device.

THIRD EMBODIMENT

Figure 9:
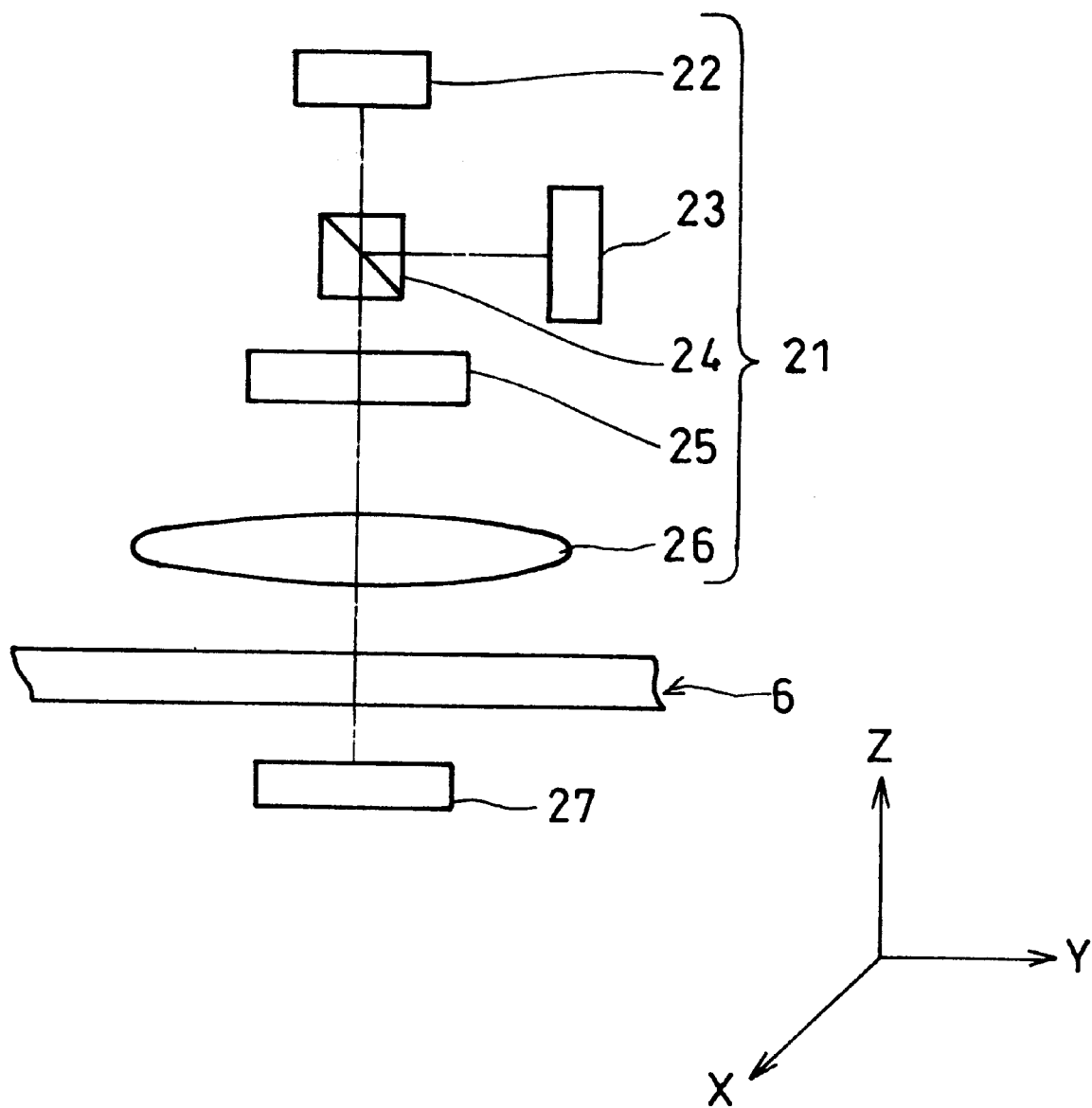
FIG. 9 is a schematic structural drawing of a magnetic recording and reproducing device according to a further embodiment of the present invention.
Figure 10:
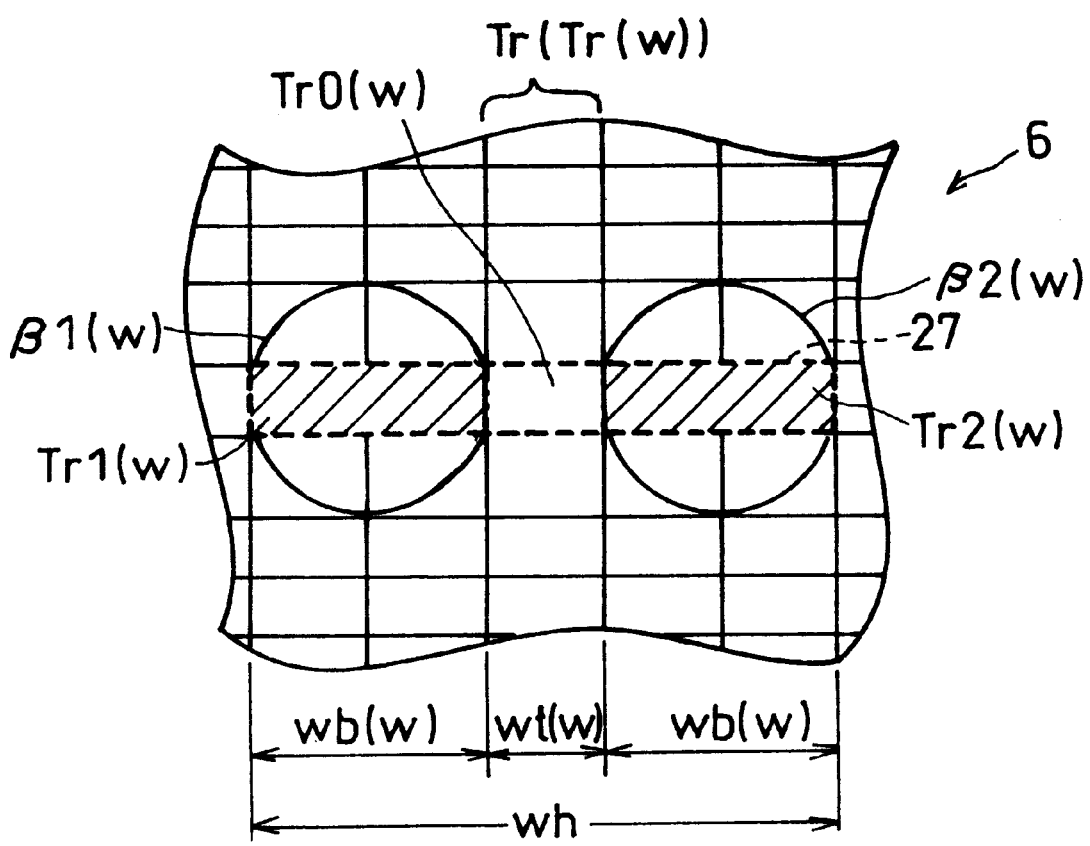
FIG. 10 is an explanatory drawing showing the relationship between a domain for recording and domains of increased temperature in a recording medium when performing recording using the magnetic recording and reproducing device shown in FIG. 9.
Figure 11:
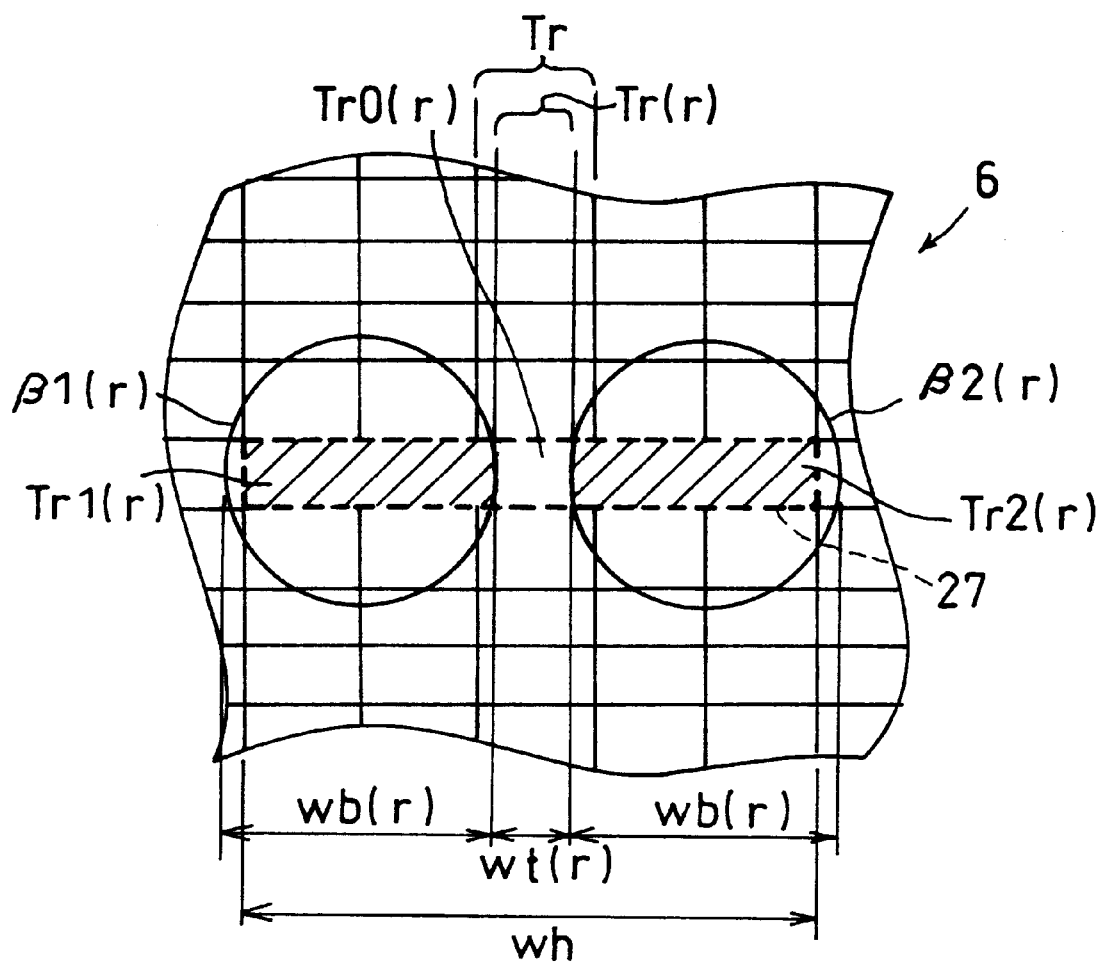
FIG. 11 is an explanatory drawing showing the relationship between a domain to be reproduced and domains of increased temperature in a recording medium when performing reproducing using the magnetic recording and reproducing device shown in FIG. 9.

The following will explain a further embodiment of the present invention with reference to FIGS. 9 through 11. For ease of explanation, structural elements having the same functions as those of the first embodiment above will be given the same reference numbers, and explanation thereof will be omitted here. The following will chiefly explain differences between the present embodiment and the first embodiment above.

As shown in FIG. 9, the magnetic recording and reproducing device according to the present embodiment is provided with an optical head 21 and a magnetic head 27. Further, the optical head 21 includes a recording laser light source 22, which produces laser light which oscillates in the YZ plane, a reproducing laser light source 23, which produces laser light which oscillates in the XY plane, a polarizing beam splitter 24, a diffractive element 25, and an objective lens 26. In other words, the foregoing magnetic recording and reproducing device includes a magnetic recording device made up of the recording laser light source 22 and the magnetic head 27 as a magnetic recording head, and the magnetic head 27 also serves as a magnetic reproducing head.

The polarizing beam splitter 24 is used to polarize laser light projected from the reproducing laser light source 23. The objective lens 26 is a convex lenses capable of converging light, and has a numerical aperture of around 0.4 to 0.6. The magnetic head 27 is used as a magnetic recording head and as a magnetic reproducing head.

The recording laser light source 22, the polarizing beam splitter 24, the diffractive element 25, the objective lens 26, and the magnetic head 27 are provided, in that order, along a common optical axis. The reproducing laser light source 23, on the other hand, is provided along another optical axis perpendicular to and intersecting the foregoing optical axis at the polarizing beam splitter 24.

In the foregoing recording and reproducing device, the recording medium 6 is provided between the optical head 21 and the magnetic head 27, more specifically, between the objective lens 26 of the optical head 21 and the magnetic head 27. The recording medium 6 has a structure equivalent to that of the first embodiment, and is positioned so that the side of the substrate 7 provided with the transparent dielectric film 8, the recording layer 9, and the protective layer 10 faces the magnetic head 27.

In a magnetic recording and reproducing device of this type, laser light projected from the recording laser light source 22 or the reproducing laser light source 23 is projected through the polarizing beam splitter 24 and into the diffractive element 25, which splits the laser light into two beams of first-order diffracted light, which then pass through the objective lens 26. The objective lens 26 focuses the laser light, as two laser beams, onto the recording medium 6 in domains thereof shown in FIGS. 10 and 11, adjacent to a domain for recording Tr(w) or a domain to be reproduced Tr(r) of a track Tr to be recorded or reproduced.

In the present embodiment, the output of the recording laser light source 22 is set such that a first domain Tr1(w) and a second domain Tr2(w) (see FIG. 10) of the recording medium 6, opposite the magnetic head 27 and adjacent to a domain for recording Tr(w) on both sides thereof, are heated to a temperature at which the coercive force of the domains Tr1(w) and Tr2(w) is greater than the coercive force of the domain for recording Tr(w) (its coercive force at room temperature; Hroom), or, preferably, to the vicinity of the magnetic compensation temperature, or, more preferably, to approximately the magnetic compensation temperature.

Further, the output of the reproducing laser light source 23 is set such that a third domain Tr1(r) and a fourth domain Tr2(r) (see FIG. 11) of the recording medium 6, opposite the magnetic head 27 and adjacent to a domain to be reproduced Tr(r) on both sides thereof, are heated to the vicinity of the magnetic compensation temperature, or, preferably, to approximately the magnetic compensation temperature.

In the present embodiment, in order to form domains of increased temperature $\beta1(r)$ and $\beta2(r)$ (see FIG. 11) during reproducing which are larger than domains of increased temperature $\beta1(w)$ and $\beta2(w)$ (see FIG. 10), formed during recording, the reproducing laser light source 23 is a semiconductor laser of longer wavelength than the recording laser light source 22. For example, a semiconductor laser of 650 nm wavelength is used as the recording laser light source 22, and a semiconductor laser of 780 nm wavelength as the reproducing laser light source 23.

In this case, in the present embodiment, since the wavelength of the reproducing laser light source 23 is longer than that of the recording laser light source 22, the domains $\beta1(r)$ and $\beta2(r)$ whose temperature is increased by the reproducing laser light source 23 are larger in area than the domains $\beta1(w)$ and $\beta2(w)$ whose temperature is increased by the recording laser light source 22. Accordingly, if wt(r) is the width of the domain whose temperature is not increased during reproducing, i.e., the width of a reproducing domain Tr0(r) (the width of the track Tr(r) to be reproduced), and wt(w) is the width of the domain whose temperature is not increased during recording, i.e., the width of a recording domain Tr0(w) (the width of the track Tr(w) to be recorded), then wt(r) is narrower than wt(w).

Accordingly, by making the reproducing laser light source 23 longer in wavelength than the recording laser light source 22, of the signal recorded in the track Tr to be recorded (the domain for recording Tr(w)), areas thereof bordering adjacent tracks, which are prone to become magnetically disordered, are not reproduced. Accordingly, low-noise reproducing can be performed.

In other words, in the present embodiment, the domain for recording Tr(w) is part of the track Tr, but the domain to be reproduced Tr(r) is part of the track Tr to be reproduced, excluding areas thereof bordering on tracks adjacent to the track Tr.

Incidentally, in order to change the size of the domain of increased temperature during recording and the domain of increased temperature during reproducing, the present embodiment used two light beam projecting means (local temperature increasing means) of different wavelength. However, it is also possible to use a single light beam projecting means, which has higher output during reproducing than during recording, changing the focusing distance by giving an electrical offset to a servo circuit.

Alternatively, using a single light beam projecting means, an aperture may be provided in front of the objective lens 26, in which case the size of the domain of increased temperature during recording and during reproducing is changed by changing the size of the aperture, which determines the diameter of the light beam projected into the objective lens 26. Further, in this case, a structure like that explained in the second embodiment, in which the magnetic head 27 and the optical head 21 are provided on the same side of the recording medium 6, may also be used.

Further, the present embodiment, as well, to simplify explanation, explained a structure in which both recording and reproducing are performed by a single magnetic head 27, but a magnetic recording head and a magnetic reproducing head may also be provided separately. For the magnetic head 27, in addition to a ring type magnetic head, a so-called single-pole type magnetic head may also be used. Further, when magnetic recording and reproducing heads are provided separately, for the magnetic reproducing head, in addition to a magnetic head which uses a coil, a magnetic head which uses a magnetoresistive element, for example, may be used.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

INDUSTRIAL APPLICABILITY

As discussed above, in the magnetic recording device according to the present invention, since the domain whose temperature is increased by the local temperature increasing means is a domain other than the domain for recording, the temperature distribution rarely extends to the actual domain for recording. For this reason, if the present magnetic recording device is used, the shape of the recorded marks can be made substantially rectangular, thus reducing crosstalk. Further, with the present magnetic recording device, since the area whose temperature is increased by the local temperature increasing means is not the actual domain for recording, but the surrounding domain, the size of the domain for recording is not limited by the diameter of the light beam spot.

When the domain for recording is one side of a domain of the recording medium opposite the magnetic head, the domain whose temperature is increased may be a domain adjacent to the domain for recording on one side thereof. However, it is preferable of the local temperature increasing means increase the temperature of domains adjacent to the domain for recording on both sides thereof. When domains on both sides of the domain for recording are heated, the domain of increased temperature can be made smaller. For example, when using light beam projecting means as the local temperature increasing means, the diameter of the light beam spot can be decreased, and the domains of increased temperature can be finely controlled.

It is preferable if the magnetic head has a width of less than three times a width of each domain of increased temperature adjacent to the domain for recording. By this means, the width of the domain for recording is less than the width of the local temperature increasing means. Accordingly, recording can be performed in domains narrower than the local temperature increasing means and narrower than the magnetic head.

By providing both the magnetic head and the local temperature increasing means on the same side of the recording medium, and by providing the magnetic head after the local temperature increasing means with respect to a direction of motion of the recording medium, the magnetic head can perform recording immediately after heating by the local temperature increasing means. In this case, heating and cooling can be performed efficiently, and spreading of the domain of increased temperature on the recording medium can be suppressed.

When the local temperature increasing means are light beam projecting means, a narrow domain can easily be increased in temperature. In addition, it is possible to change the width and temperature of the domain of increased temperature by adjusting the power of the light beam. This means that the medium can easily be brought to the same coercive force with high repeatability, and equal track widths can be formed.

In the magnetic recording and reproducing device according to the present invention, the domain whose temperature is increased by the local temperature increasing means is a domain other than the domain for recording. Accordingly, when recording information using the present magnetic recording and reproducing device, since the temperature distribution rarely extends to the actual domain for recording, the shape of the recorded marks can be made substantially rectangular. Accordingly, a signal can be read out from recorded marks recorded in substantially rectangular shape, crosstalk from adjacent recorded bits in the track direction can be suppressed, and accurate recording and reproducing can be performed.

Further, in the present magnetic recording and reproducing device, since the area whose temperature is increased by the local temperature increasing means is not the actual domain for recording, but the surrounding domain, the size of the domain for recording is not limited by the diameter of a light beam spot, as was the case conventionally.

If the recording and reproducing device according to the present invention also includes a magnetic reproducing head and local temperature increasing means for reproducing, which increase the temperature of the recording medium in a domain thereof opposite the magnetic reproducing head but excluding a domain to be reproduced, to the vicinity of a magnetic compensation temperature thereof, by increasing the temperature of a domain opposite the magnetic head but excluding a domain to be reproduced, information recorded by the present recording and reproducing device can be reproduced with residual magnetization of domains other than the domain to be reproduced substantially at zero. Accordingly, even if the width of the magnetic reproducing head is greater than the width of the domain to be reproduced, information recorded in the domain for reproducing can be selectively reproduced, and crosstalk can be reduced.

In the present recording and reproducing device, if the domain whose temperature is increased by said local temperature increasing means for reproducing is made up of domains adjacent to the domain to be reproduced, on both sides thereof, and if the magnetic reproducing head has a width of less than three times a width of each domain of increased temperature adjacent to the domain to be reproduced, the width of the domain to be reproduced is smaller than the width of the local temperature increasing means. Accordingly, information can be reproduced from a domain narrower than the width of the local temperature increasing means, the width of the magnetic reproducing head, etc. This facilitates manufacture of the magnetic reproducing head, and is advantageous in reducing track width and increasing recording density.

In the present magnetic recording and reproducing device, by providing both the magnetic reproducing head and the local temperature increasing means for reproducing on the same side of the recording medium, and providing the magnetic reproducing head after the local temperature increasing means for reproducing with respect to a direction of motion of the recording medium, the magnetic head can perform reproducing immediately after heating by the local temperature increasing means. In this case, heating and cooling can be performed efficiently, and the width of the domain of increased temperature on the recording medium does not become overly large.

In the present recording and reproducing device, by setting the domain of the recording medium whose temperature is increased by the local temperature increasing means for reproducing so as to be larger than the domain whose temperature is increased by the local temperature increasing means for recording, information can be reproduced from a domain smaller than the domain for recording. Accordingly, by not reproducing domains bordering on the domain for recording, it is possible to perform reproducing of narrow tracks, without influence from the foregoing magnetic disorder.

In the present recording and reproducing device, by using light beam projecting means as the local temperature increasing means, a narrow domain can easily be increased in temperature. In addition, it is possible to change the width and temperature of the domain of increased temperature by adjusting the power of the light beam. This means that the medium can easily be brought to the same residual magnetization with high repeatability, which is advantageous in always forming tracks of the same width.

With the magnetic recording method according to the present invention, the recording medium made of ferrimagnetic material has a magnetic compensation point, and coercive force increases with increase in temperature. At the magnetic compensation point, residual magnetization is zero, and coercive force is infinite. Accordingly, as discussed above, by applying a magnetic field smaller than the coercive force in the domain of increased temperature, and greater than the coercive force of the domain for recording (i.e., its coercive force at room temperature), it is possible to record information solely in the domain for recording. Further, since the domain whose temperature is increased is a domain other than the domain for recording, the temperature distribution rarely extends to the actual domain for recording, and thus the shape of the recorded marks can be made substantially rectangular, thus reducing crosstalk.

In the present magnetic recording method, by increasing the temperature of domains adjacent to the domain for recording, on both sides thereof, the domain of increased temperature can be made smaller. For example, when the foregoing local temperature increasing means are light beam projecting means, the diameter of the light beam spot can be decreased, and the domains of increased temperature can be finely controlled.

In the present magnetic recording method, by heating the recording medium such that the width of each domain of increased temperature adjacent to the domain for recording has a width of more than ⅓ the width of the magnetic head, the width of the domain for recording is less than the width of the local temperature increasing means. Accordingly, recording can be performed in domains narrower than the local temperature increasing means (diameter of a light beam spot, etc.) or the magnetic head.

In the present magnetic recording method, by performing the temperature increasing step (a) by projection of a light beam, a narrow domain can easily be increased in temperature. In addition, it is possible to change the width and temperature of the domain of increased temperature by adjusting the power of the light beam. This means that the medium can easily be brought to the same coercive force with high repeatability, and tracks of equal width can be formed.

What is claimed is:

1. A magnetic recording device which performs recording by magnetic field modulation using a recording medium having a recording layer made of ferrimagnetic material, and which comprises:

a magnetic head, which applies an alternating external magnetic field to the recording medium during recording according to information to be recorded; and local temperature increasing means, which increase a temperature of the recording medium in a domain thereof opposite said magnetic head but excluding a domain for recording.

2. The magnetic recording device set forth in claim 1, wherein:

said magnetic head and said local temperature increasing means are both provided on the same side of the recording medium; and said magnetic head is provided after said local temperature increasing means with respect to a direction of motion of the recording medium.

3. The magnetic recording device set forth in claim 1, wherein:

said local temperature increasing means are light beam projecting means.

4. The magnetic recording device set forth in claim 1, wherein:

the domain whose temperature is increased by said local temperature increasing means is made up of domains adjacent to the domain for recording, on both sides thereof.

5. The magnetic recording device set forth in claim 4, wherein:

said magnetic head and said local temperature increasing means are both provided on the same side of the recording medium; and said magnetic head is provided after said local temperature increasing means with respect to a direction of motion of the recording medium.

6. The magnetic recording device set forth in claim 4, wherein:

said local temperature increasing means are light beam projecting means.

7. The magnetic recording device set forth in claim 4, wherein:

said magnetic head has a width of less than three times a width of each domain of increased temperature adjacent to the domain for recording.

8. The magnetic recording device set forth in claim 7, wherein:

said local temperature increasing means are light beam projecting means.

9. The magnetic recording device set forth in claim 7, wherein:

said magnetic head and said local temperature increasing means are both provided on the same side of the recording medium; and said magnetic head is provided after said local temperature increasing means with respect to a direction of motion of the recording medium.

10. The magnetic recording device set forth in claim 9, wherein:

said local temperature increasing means are light beam projecting means.

11. A recording and reproducing device which performs recording and reproducing by magnetic field modulation using a recording medium having a recording layer made of ferrimagnetic material, and which comprises:

a magnetic recording head, which, during recording, applies an alternating external magnetic field to the recording medium according to information to be recorded; and local temperature increasing recording means for recording, which increase a temperature of the recording medium in a domain thereof opposite said magnetic recording head but excluding a domain for recording.

12. The recording and reproducing device set forth in claim 11, further comprising:

a magnetic reproducing head; and local temperature increasing means for reproducing, which increase the temperature of the recording medium in a domain thereof opposite said magnetic reproducing head but excluding a domain to be reproduced, to the vicinity of a magnetic compensation temperature thereof.

13. The magnetic recording and reproducing device set forth in claim 12, wherein:

said magnetic reproducing head and said local temperature increasing means for reproducing are both provided on the same side of the recording medium; and said magnetic reproducing head is provided after said local temperature increasing means for reproducing with respect to a direction of motion of the recording medium.

14. The recording and reproducing device set forth in claim 12, wherein:

the domain of the recording medium whose temperature is increased by said local temperature increasing means for reproducing is set so as to be larger than the domain whose temperature is increased by said local temperature increasing means for recording.

15. The recording and reproducing device set forth in claim 12, wherein:

said local temperature increasing means for reproducing are light beam projecting means.

16. The recording and reproducing device set forth in claim 12, wherein:

the domain whose temperature is increased by said local temperature increasing means for reproducing is made up of domains adjacent to the domain to be reproduced, on both sides thereof; and said magnetic reproducing head has a width of less than three times a width of each domain of increased temperature adjacent to the domain to be reproduced.

17. The recording and reproducing device set forth in claim 16, wherein:

the domain of the recording medium whose temperature is increased by said local temperature increasing means for reproducing is set so as to be larger than the domain whose temperature is increased by said local temperature increasing means for recording.

18. The recording and reproducing device set forth in claim 16, wherein:

said local temperature increasing means for reproducing are light beam projecting means.

19. The magnetic recording and reproducing device set forth in claim 16, wherein:

said magnetic reproducing head and said local temperature increasing means for reproducing are both provided on the same side of the recording medium; and said magnetic reproducing head is provided after said local temperature increasing means for reproducing with respect to a direction of motion of the recording medium.

20. The recording and reproducing device set forth in claim 19, wherein:

said local temperature increasing means for reproducing are light beam projecting means.

21. The recording and reproducing device set forth in claim 19, wherein:

the domain of the recording medium whose temperature is increased by said local temperature increasing means for reproducing is set so as to be larger than the domain whose temperature is increased by said local temperature increasing means for recording.

22. The recording and reproducing device set forth in claim 21, wherein:

said local temperature increasing means for reproducing are light beam projecting means.

23. A magnetic recording method based on magnetic field modulation comprising the steps of:

(a) increasing a temperature of a recording medium, which has a recording layer made of ferrimagnetic material, in a domain thereof opposite a magnetic head but excluding a domain for recording; and (b) applying to the recording medium an alternating external magnetic field according to information to be recorded, wherein the alternating external magnetic field is smaller than a coersive force of the domain of increased temperature, and greater than a coersive force of the domain for recording opposite the magnetic head.

24. The magnetic recording method set forth in claim 23, wherein:

said step (a) is performed by projecting a light beam.

25. The magnetic recording method set forth in claim 23, wherein:

in said step (a), domains of the recording medium adjacent to the domain for recording on both sides thereof are increased in temperature.

26. The magnetic recording method set forth in claim 25, wherein:

in said step (a), the temperature of the recording medium is increased such that each domain of increased temperature has a width of more than $\frac{1}{3}$ of a width of the magnetic head.

27. The magnetic recording method set forth in claim 25, wherein:

said step (a) is performed by projecting a light beam.

* * * * *